United States Patent Office 2,726,926
Patented Dec. 13, 1955

2,726,926

PROCESS FOR THE PRODUCTION OF LITHIUM BOROHYDRIDE

Raymond Etienne Paul, Versailles, Seine-et-Oise, and Nicole Marie Joseph, Paris, France, assignors to Societe des Usines Chimiques Rhone-Poulenc, Paris France No Drawing. Application November 21, 1952,
Serial No. 321,951

Claims priority, application France December 1, 1951

4 Claims. (Cl. 23—14)

This invention relates to a new and improved process for the production of lithium borohydride and solutions thereof in inert solvents.

Of the alkali metal borohydrides of the type $MBH_4$, lithium borohydride is of particular interest, because of the large volume of hydrogen which can be generated for a given weight of the borohydride and because it is a more powerful reducing agent than the other alkali metal borohydrides. However, lithium borohydride has not as yet been put to any important use, mainly because the known methods of preparation are not straightforward and involve the use of starting materials such as diborane or metallic lithium which are not readily accessible.

It is an object of the invention to provide a new process for the production of lithium borohydride and solutions thereof in inert solvents. It is a further object of the invention to provide a simple process for the production of the said compound and solutions thereof in inert solvents using relatively easily obtainable starting materials. A still further object of the invention is to provide a process for the production of solutions of lithium borohydride in inert solvents therefor for use directly as reducing agents without the need for isolating the lithium borohydride.

It has now been found according to the present invention that lithium borohydride may readily be produced in a simple manner by a process which comprises reacting the borohydride of sodium, or preferably of potassium, with a lithium salt to effect double decomposition in the presence of a solvent for the lithium salt and for lithium borohydride. Since the solvent must be inert with respect to lithium borohydride, the use of water or of the lower alcohols as solvent is excluded. Tetrahydrofurane, and to a lesser extent glycol formal, are suitable solvents.

The yield of lithium borohydride will depend upon the particular lithium salt used. Using tetrahydrofurane as solvent, lithium chloride gives excellent yields. The potassium chloride formed by double decomposition is insoluble in this solvent, and may readily be separated. Under the same conditions the use of the bromide, iodide or nitrate of lithium is less advantageous.

A convenient method of operation is to add the powdered lithium salt to a suspension of potassium borohydride or sodium borohydride in the solvent. It is possible to operate the process at various temperatures and within wide limits of concentration, for example from 1 to 3.5 gram molecules per litre. The general procedure is to work in the presence of an excess of lithium salt, for example 1.25 molecules for each molecule of borohydride, so as to ensure that this latter will be more fully utilized.

The solutions of lithium borohydride resulting when for example lithium chloride is made to react with potassium borohydride in the presence of tetrahydrofurane possess all the reducing properties attributable to lithium borohydride, particularly with regard to the reduction of esters. These solutions are especially stable to moisture and in many cases can be employed as such in reduction processes. It is possible, if so desired, to free the resulting solutions from lithium chloride by partial evaporation of the solvent until the concentration of lithium borohydride amounts to 6 gram molecules per litre of solution. The lithium chloride is thereby precipitated almost quantitatively. It may be simply separated by decantation and whilst still moistened with concentrated lithium borohydride solution may be used again in a further operation. The concentrated solutions of lithium borohydride thus obtained are very stable and strongly reducing. They can be used directly as reducing agents. It is also possible to obtain from them dry lithium borohydride containing about 5% of lithium chloride by evaporating the tetrahydrofurane completely. The product thus obtained is a white solid which is very hygroscopic and ozidises rapidly in humid air.

The invention is illustrated by the following example:

Example 20 g. of potassium borohydride containing 94% by weight of $KBH_4$ are placed in a three-necked flask fitted with a condenser, an agitator and a thermometer as a suspension in 200 cc. of tetrahydrofurane freed from peroxide by distillation over sodium. There are added 23 g. of 80% technical lithium chloride (the impurities chiefly comprise potassium chloride and water). A flow of cooling water is employed to keep the temperature of the mixture in the region of 20° C. and agitation is maintained for 8 hours.

The potassium chloride produced together with the last traces of potassium borohydride form a dense precipitate which can be separated simply by decantation from the solution of lithium borohydride. The precipitate is washed by extracting twice with 25 cc. of fresh tetrahydrofurane.

The resulting solution of lithium borohydride is clarified by filtration or by centrifuging in dried containers.

Under the operating conditions described 200 cc. of solution can be obtained, containing:

Gram molecules per litre
$LiBH_4$ _____ 1.5
$LiCl$ _____ 0.8 corresponding to a yield of $LiBH_4$ of 85% based upon the weight of potassium borohydride employed.

Three quarters of the tetrahydrofurane is evaporated under reduced pressure in an atmosphere of nitrogen. In this way a concentrated solution of lithium borohydride is obtained, containing:

Gram molecules per litre
$LiBH_4$ _____ 5.8
$LiCl$ _____ 0.1

The lithium chloride formed once more separates at the bottom of the flask.

After decanting the solution, the solvent is completely evaporated from the residue in a forced vacuum, first at ambient temperature and then, when the product is solid, at 100–120° C. for one hour. In this way there is obtained a white solid having 93.7% by weight of $LiBH_4$ as determined by alkalimetric titration against N/10 hydrochloric acid and by measuring the volume of hydrogen liberated in the course of the titration.

The compound glycol formal referred to herein is also known as 1:3-dioxacyclopentane, the terms being used synonymously, for example in J. Chem. Soc. 1933, page 1598.

We claim:

1. A process for the production of a solution of lithium borohydride in an inert solvent therefor which comprises reacting in said solvent the borohydride of an alkali metal selected from the class consisting of sodium and potassium with an excess of a lithium salt soluble in said solvent to effect double decomposition, said lithium salt being so chosen that the alkali metal salt formed by the double decomposition is but sparingly soluble in said solvent, and which process also comprises the steps of concentrating the resulting solution by partial evaporation of the solvent thereby to eliminate from solution a major portion of the said lithium salt, and freeing the solution so produced from undissolved material.

2. A process for the production of a solution of lithium borohydride in a solvent selected from the group consisting of tetrahydrofurane and glycol formal which comprises reacting the borohydride of an alkali metal selected from the class consisting of sodium and potassium with an excess of lithium chloride in said solvent to effect double decomposition, concentrating the resulting solution by partial evaporation of the solvent thereby to eliminate from solution a major portion of the lithium chloride, and freeing the solution so produced from undissolved material.

3. A process for the production of lithium borohydride which comprises forming a solution of lithium borohydride in an inert solvent therefor by reacting in said solvent the borohydride of an alkali metal selected from the class consisting of sodium and potassium with an excess of a lithium salt soluble in said solvent to effect double decomposition, said lithium salt being so chosen that the alkali metal salt formed by the double decomposition is but sparingly soluble in said solvent, and which process also comprises the steps of concentrating the resulting solution, freed from insoluble material, by partial evaporation of the solvent thereby to eliminate from solution a major portion of the said lithium salt, freeing the solution so produced from undissolved matter contained therein and recovering lithium borohydride from the resulting solution.

4. A process for the production of lithium borohydride which comprises forming a solution of lithium borohydride in a solvent selected from the group consisting of tetrahydrofurane and glycol formal by reacting in said solvent the borohydride of an alkali metal selected from the class consisting of sodium and potassium with an excess of lithium chloride to effect double decomposition, concentrating the resulting solution, freed from insoluble material, by partial evaporation of the solvent thereby to eliminate from solution a major portion of the lithium chloride, freeing the solution so produced from undissolved material and recovering lithium borohydride from the resulting solution.

References Cited in the file of this patent

Schechter et al: "Boron Hydrides and Related Compounds," printed March 1951, declassified December 1953, Dept. of Navy, Bureau of Aeronautices, pages 47, 120.